May 19, 1942. L. J. B. GUYARD 2,283,202
REINFORCED MOTION PICTURE FILM
Filed Aug. 5, 1939
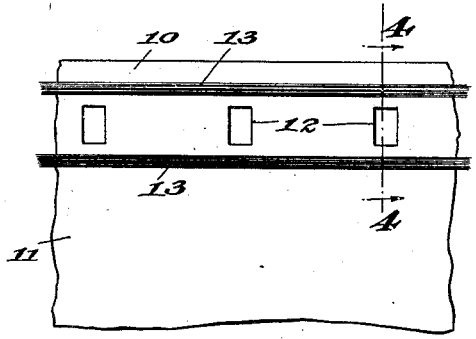
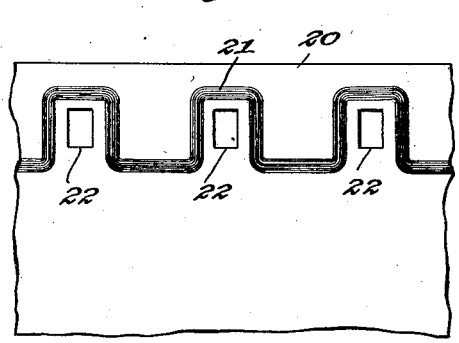
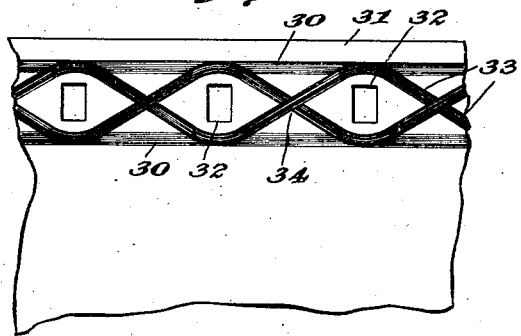
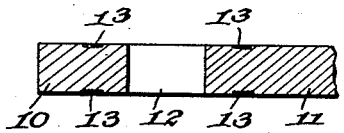
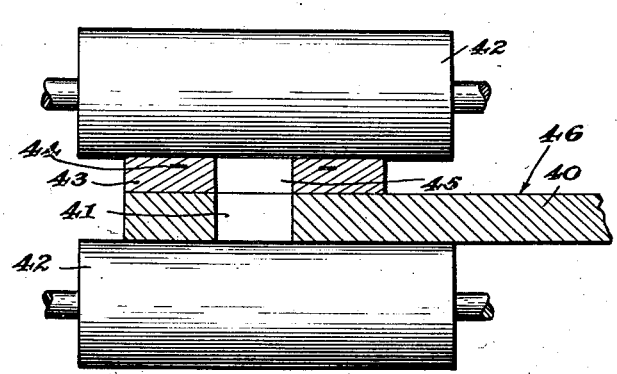
INVENTOR
Leon Jean Baptiste Guyard,
BY
ATTORNEY Patented May 19, 1942

2,283,202

UNITED STATES PATENT OFFICE 2,283,202

REINFORCED MOTION PICTURE FILM

Léon Jean-Baptiste Guyard, Paris, France, assignor to Owens-Corning Fiberglas Corporation, a corporation of Delaware Application August 5, 1939, Serial No. 288,565
In France August 18, 1938

6 Claims. (Cl. 88—19.5)

The reinforced sheet material comprising the present invention is primarily adapted for use in strip form as a motion picture film, with or without photoelectric or other sound tracks thereon, or simply as a sound film alone, although the principles of the invention are applicable to other uses and the reinforced sheet material may be found useful in various forms, particularly if it is subject to the disruptive action of mechanical forces.

Heretofore many plastic materials such as cellulous acetate (particularly diacetate), methyl methacrylate, vinyl resins, phenol-formaldehyde and urea-formaldehyde, and other materials of a non-inflammable or non-explosive nature have not been extensively used as a basic material for the production of photographic motion picture or sound film because of the fact that these materials in sheet form when sufficiently thin to react favorably to the photographic process and to transmit light therethrough in the motion picture or sound projection machine are not resistant to wear, particularly in the neighborhood of the usual perforations provided in such films for reception of the sprocket teeth by means of which the film is advanced through the projection machine.

For this reason Celluloid and other inflammable and explosive derivatives of nitrocellulose have been extensively used in the production of such films inasmuch as they are more resistant to mechanical stresses in the perforated regions of the film.

The disadvantage in the use of highly inflammable and explosive motion picture or sound films is obviously the fire hazard involved both in the manufacture of the film and in the actual use thereof in a motion picture or sound projection apparatus as well as in the storing of the film when not in use.

The present invention is designed to overcome the above noted disadvantage by permitting the use of non-inflammable, although less resistant, materials for motion picture and sound films. Toward this end the invention contemplates the provision of a non-inflammable strip or sheet constituting the film in which the regions surrounding the sprocket perforations of the film are adequately reinforced by means of fibers in the form of threads, filaments, strands and the like.

It has been found that while various fibers whether of inorganic or organic content, may be used for this purpose, inorganic fibers composed specifically of glass are preferable inasmuch as many of the non-inflammable materials above enumerated, particularly cellulose acetate in the form of diacetate, is peculiarly adherent to glass throughout a wide range of temperatures. Furthermore, when glass fibers are employed to reinforce the regions surrounding the perforations, separation of the fibers from the diacetate material is not likely to occur either due to rotting when moisture is encountered or when high temperatures are attained in the projection apparatus.

The principal object of the invention therefore is to provide a film of cellulose diacetate or other non-inflammable or non-explosive material having marginal sprocket perforations therein which are reinforced by glass fibers which are non-absorbent and are not subject to decomposition under the influence of moisture or heat.

Another object of the invention, in a modified form thereof, is to provide a reinforced film of the character set forth above in which, when the film is wound on a spool in the usual manner, the photo-sensitized and developed areas thereof are out of contact with each other.

A further object of the invention is to provide a novel method by means of which the glass fibers may be incorporated with the film material to reinforce the perforations existing therein.

Other objects and advantages of the invention, not at this time enumerated, will be come apparent as the following description ensues:

In the accompanying single sheet of drawings:

Figs. 1, 2 and 3 are respective fragmentary plan views showing photographic film fragments in which the marginal perforations therein are reinforced by fibrous material in respectively different manners.

Fig. 4 is a sectional view taken substantially along the line 4—4 of Fig. 1, and Fig. 5 is a sectional view similar to Fig. 4 showing a modified form of film fragment.

Referring to Fig. 1, a strip of film 10 having an effective photosensitized and developed area 11 is formed with the usual marginal sprocket perforations 12 by means of which the length of film is propelled through a projection machine. The film may be formed of a non-inflammable and non-explosive plastic material such as any one or a combination of countless cellulose esters, methyl methacrylate, vinyl resins, phenol- or urea-formaldehyde resins, or other materials which are non-inflammable or non-explosive, cellulose diacetate being particularly desirable for reasons already outlined.

A series of fibers in the form of a bundle of filaments, threads or the like is pressed into or otherwise embedded in the material of the film on each side of the series of perforations 12, the two series of fibers extending in parallelism longitudinally of the film and coextensive with the latter. The fibers of either series are designated collectively at 13 and serve to reinforce the regions surrounding the perforations and to localize the stresses applied to these regions and isolate them from the photosensitized and developed region 11 of the film, thus preventing distortion of the visual or sound images or tracks of the film.

In Fig. 2, the film 20 has embedded therein a single series 21 of fibers which passes around each perforation 22 on three sides thereof and which extends between each adjacent pair of perforations in the manner shown. In this manner the intervening regions between adjacent perforations which receive the stress of the impelling sprocket teeth of the projection machine are adequately reinforced.

In Fig. 3, a series 30 of fibers similar to the series 13 of Fig. 1 extends longitudinally of the film 31 on each side of the series of perforations 32 and additionally, two other series 33 of such fibers extend longitudinally of the film and cross each other as at 34 between each pair of adjacent perforations. A comparatively high degree of reinforcement for the regions surrounding the perforations 32 is thus afforded.

The various series of fibers 13, 21, 30 and/or 33 as the case may be are incorporated in the film material as the same is manufactured and may be completely or partially embedded therein, the film being rolled in any suitable manner to a condition of uniform thickness throughout.

In Fig. 5 a modified form of film is shown together with a schematic representation of an apparatus by means of which the film may be produced. The basic film material 40 having marginal perforations 41 therein has applied thereto by means of heated platens 42 a thin ribbon 43 of the diacetate or other material with which the series of fibers 44 has originally been incorporated in accordance with a pattern determined by the nature of the perforations 45 in the basic film. The application of the ribbon 43 to the basic film material 40 may be performed directly or, if desired, a suitable adhesive may be employed. Perforations 45 are formed in the ribbon 43 and register with the perforations 41 in the basic film.

It is to be noted in connection with Fig. 5 that the additional marginal thickness of the completed film afforded by the ribbon 43 will, when the film is wound upon a spool in the usual manner, serve to maintain the effective photographic portions 46 of the film out of contact with each other, thus reducing friction blemishes or the like to a minimum throughout the life of the film.

Modifications may be resorted to within the spirit of the appended claims. For example, the arrangement of the various series of fibers that serve to reinforce the regions surrounding the perforations in the film may be altered to meet the requirements of the film. Also the particular fiber pattern may be incorporated with the film in its original manufacture or by incorporating it in a ribbon and subsequently causing the ribbon to be applied to the basic film in the manner described. Only insofar as the invention has particularly been pointed out in the appended claims is the same to be limited.

I claim:

1. A strip of plastic material having a series of spaced marginal perforations therein, and a plurality of glass fibers embedded throughout their lengths in the plastic material in the form of a band extending substantially uninterruptedly along one side of the series of perforations and in the form of loops into the spaces between adjacent perforations to substantially surround each perforation at three sides.

2. A strip of non-inflammable film having a series of marginal perforations therein, a pair of substantially continuous bands of glass fibers embedded in the material of the film and extending longitudinally of the perforations on each side thereof in close proximity thereto, and a third substantially continuous band of glass fibers similarly embedded and extending back and forth between the bands of the pair crossing between each pair of adjacent perforations.

3. A reinforced strip of plastic material having a series of marginal perforations therein, a pair of continuous bands of glass fibers embedded in the material and extending longitudinally of, and in close proximity to, the perforations on opposite sides thereof, and a second pair of substantially continuous bands of glass fibers embedded in the material, the bands of the second pair extending back and forth between the bands of the first pair in crisscrossed relation with each other and crossing each other in the space between adjacent perforations.

4. A reinforced strip of plastic material having a series of marginal perforations therein, and a narrow substantially continuous ribbon of glass fibers embedded throughout its length in the material of the strip and extending generally lengthwise of the series of perforations in proximity thereto, the ribbon extending across the spaces between adjacent perforations in such a manner as to substantially surround each perforation at three sides thereof and thereby reinforce the strip in the region of the perforations.

5. An elongated reinforced strip of plastic material having a series of marginal perforations therein, and a narrow substantially continuous band of glass fibers embedded in the material and extending generally lengthwise of the perforations and in proximity thereto, said band passing alternately at inner and outer sides respectively of adjacent perforations so as to extend substantially diagonally across the spaces between adjacent perforations, thereby reinforcing the strip in the region of perforations.

6. A reinforced strip of plastic material having a series of perforations therein, a pair of substantially continuous bands of glass fibers embedded in the material and extending generally longitudinally of and in close proximity to the perforations, each of said bands passing alternately at inner and outer sides respectively of adjacent perforations and diagonally across the spaces between adjacent perforations, said bands being respectively oppositely disposed so that the diagonally extending portions cross each other in the spaces between the perforations.

LÉON JEAN-BAPTISTE GUYARD.